US012266453B2

(12) United States Patent
Hill et al.

(10) Patent No.: US 12,266,453 B2
(45) Date of Patent: Apr. 1, 2025

(54) CONTAINERS

(71) Applicant: CAPSA SOLUTIONS LIMITED, Sheffield (GB)

(72) Inventors: James Hill, Sheffield (GB); Mark Farrell, Sheffield (GB)

(73) Assignee: CAPSA SOLUTIONS LIMITED, Sheffield (GB)

( * ) Notice: Subject to any disclaimer, the term of this patent is extended or adjusted under 35 U.S.C. 154(b) by 515 days.

(21) Appl. No.: 17/596,790

(22) PCT Filed: Jul. 3, 2020

(86) PCT No.: PCT/GB2020/051605
§ 371 (c)(1),
(2) Date: Dec. 17, 2021

(87) PCT Pub. No.: WO2021/005342
PCT Pub. Date: Jan. 14, 2021

(65) Prior Publication Data

US 2022/0254534 A1 Aug. 11, 2022

(30) Foreign Application Priority Data

Jul. 5, 2019 (GB) ..................................... 1909700

(51) Int. Cl.
*G21F 5/12* (2006.01)
*B65D 45/24* (2006.01)
(Continued)

(52) U.S. Cl.
CPC ............. *G21F 5/125* (2019.01); *B65D 45/24* (2013.01); *B65D 45/34* (2013.01); *B65D 51/16* (2013.01); *B65D 51/245* (2013.01)

(58) Field of Classification Search
None
See application file for complete search history.

(56) References Cited

U.S. PATENT DOCUMENTS 5,148,938 A * 9/1992 Morgan, Jr. ............. F16J 13/08 220/360
2004/0060938 A1 4/2004 Lehning et al.
(Continued)

FOREIGN PATENT DOCUMENTS

CN 108069110 A 5/2018
JP 10020075 A * 1/1998
(Continued)

OTHER PUBLICATIONS

PCT International Search Report and Written Opinion for International Application No. PCT/GB2020/051605, dated Dec. 18, 2020, 19 pages.

(Continued)

*Primary Examiner* — Andrew Smyth
(74) *Attorney, Agent, or Firm* — Hoffman Warnick LLC

(57) ABSTRACT

Disclosed is a lid (10) for closing a receptacle (20), the lid comprising: a static portion (18) arranged to substantially match an opening of the receptacle to be closed; a plurality of pivoting arms (11) coupled to the static portion; means (12) for moving the plurality of pivoting arms between a first position wherein the plurality of pivoting arms lie within a perimeter of the static portion and a second position wherein the plurality of pivoting arms lie outside a perimeter of the static portion and engage with a complementary feature of the receptacle.

12 Claims, 7 Drawing Sheets

(51) Int. Cl.
*B65D 45/34* (2006.01)
*B65D 51/16* (2006.01)
*B65D 51/24* (2006.01)

(56) References Cited

U.S. PATENT DOCUMENTS

| | | | | |
|---|---|---|---|---|
| 2004/0154955 | A1 | 8/2004 | Friar et al. | |
| 2007/0246375 | A1* | 10/2007 | Wickland | G21F 5/005<br>206/1.5 |
| 2012/0187316 | A1 | 7/2012 | Mayfield et al. | |
| 2014/0192946 | A1 | 7/2014 | Singh | |
| 2016/0214792 | A1 | 7/2016 | David et al. | |

FOREIGN PATENT DOCUMENTS

| | | | |
|---|---|---|---|
| JP | 1998020075 | A | 1/1998 |
| WO | 2011093572 | A1 | 8/2011 |

OTHER PUBLICATIONS

Great Britain Search Report for Application No. GB1909700.5, dated Sep. 5, 2019, 7 pages.

ThomasJ1, Jul. 24, 2015, "Simple Vault Mechanism," https://www.instructables.com/id/Simple-Vault-Mechanism, Sep. 4, 2019.

Japanese Patent Application No. 2021-576735 Notice of Reasons for Rejection dated Jun. 13, 2024, 9 pages (with translation).

* cited by examiner

CONTAINERS

The present invention relates to an improved container. It relates particularly to an improved container for use in storing hazardous materials. Even more particularly, it relates to a container for use in storing radioactive waste, where it is desirable for the container to be handled, filled and manipulated remotely i.e. where human interaction is minimised and/or carried out at a safe distance from the container.

Radioactive waste may be classified into various categories, with the most dangerous waste requiring very specialised handling and storage. Lower level waste, which may comprise material and objects which have been in contact with more dangerous materials still require specialised handling and storage.

In the prior art, low and intermediate level radioactive material which is to be disposed of is typically placed into large cuboid containers which are provided with a planar lid which is fastened in place by means of a plurality of nuts/bolts. The fastening of the lid can be time consuming, error-prone and may be difficult to do effectively in a remote manner.

Furthermore, the volumetric efficiency of cuboid containers can be low, since it can be difficult to properly fill the container in corners which may be difficult to reach from the opening. Still further, the lids of such containers tend to be relatively thick and so consume a considerable proportion of the available volume.

It is an aim of embodiments of the present invention to address issues with the prior art containers, whether mentioned herein or not.

According to the present invention there is provided an apparatus and method as set forth in the appended claims. Other features of the invention will be apparent from the dependent claims, and the description which follows.

According to a first aspect of the present invention, there is provided a lid (10) for closing a receptacle (20), the lid comprising: a static portion (18) arranged to substantially match an opening of the receptacle to be closed; a plurality of pivoting arms (11) coupled to the static portion; means (12) for moving the plurality of pivoting arms between a first position wherein the plurality of pivoting arms lie within a perimeter of the static portion and a second position wherein the plurality of pivoting arms lie outside a perimeter of the static portion and engage with a complementary feature of the receptacle.

In an embodiment, the means (12) for moving the plurality of pivoting arms (11) comprises an annular member coupled to and movable relative to the static member.

In an embodiment, the annular member is coupled to the static member by means of a plurality of fasteners (16) arranged to pass through respective slots (17) in the annular member (12) and fasten to the static member (18).

In an embodiment, the annular member (12) is provided with a plurality of teeth on an inner circumference thereof.

In an embodiment, the means for moving the plurality of pivoting arms and the plurality of pivoting arms each comprise complementary couplings to facilitate a relative pivoting action therebetween.

In an embodiment, the complementary couplings comprise a substantially circular recess (12*a*) and a substantially circular projection (11*a*), whereby the substantially circular projection lies within the substantially circular recess and is arranged to rotate within it.

In an embodiment, the plurality of pivoting arms are each coupled to the static portion by means of fastener (14) arranged to pass through a respective slot (15) in each of the plurality of pivoting arms and fasten to the static member.

In an embodiment, the lid is provided with one or more vents (50) to permit the escape of gas from within the receptacle (20).

In an embodiment, there is provided an indicator to indicate the locked or unlocked status of the lid.

According to a second aspect of the present invention, there is provided a receptacle (20) arranged to receive the lid (10) of the first aspect.

In an embodiment, the receptacle comprises an opening for receiving the static portion (18) of the lid, wherein proximal the opening there is provided a relatively inward-facing projection (25) to support the lid.

In an embodiment, the relatively inward-facing projection (25) comprises a plurality of springs (23) arranged to provide, in use, a relatively upward force to the lid (10).

In an embodiment, the plurality of springs (23) are each arranged in a recess (24) in the relatively inward-facing projection (25).

In an embodiment, a circumferential groove (22) is provided proximal the opening, arranged to receive the plurality of pivoting arms (11).

According to a third aspect of the present invention, there is provided container (1) comprising the lid of the first aspect and the receptacle of the second aspect.

According to a fourth aspect of the present invention, there is provided method of closing a container (1), using the lid of the first aspect, comprising the steps of:

placing the lid in an opening of a receptacle (20) and applying a relatively downward force thereto;

operating a closure mechanism while applying the downward force; and removing the downward force.

For a better understanding of the invention, and to show how embodiments of the same may be carried into effect, reference will now be made, by way of example, to the accompanying diagrammatic drawings in which.

Figure 5A:
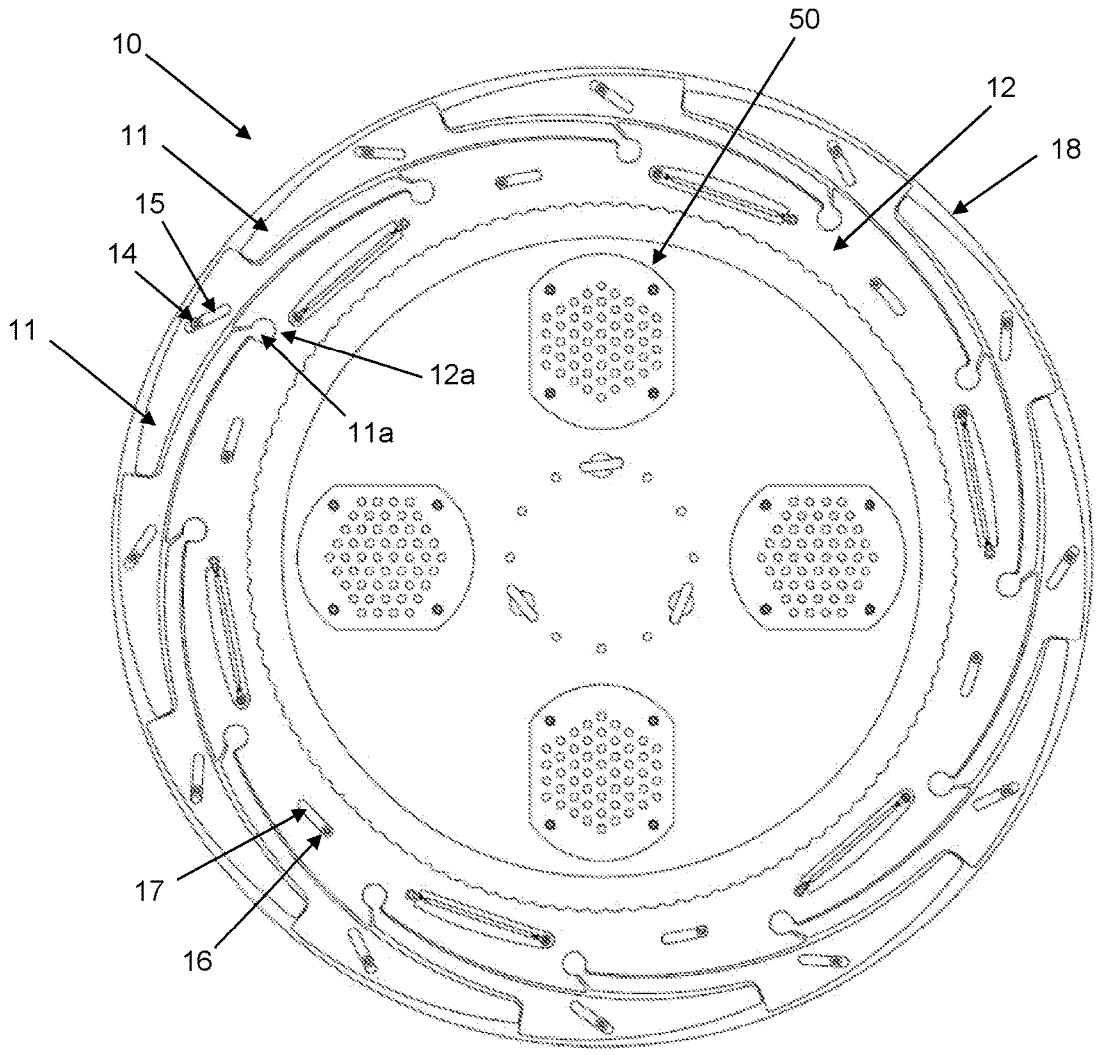
Figure 5B:
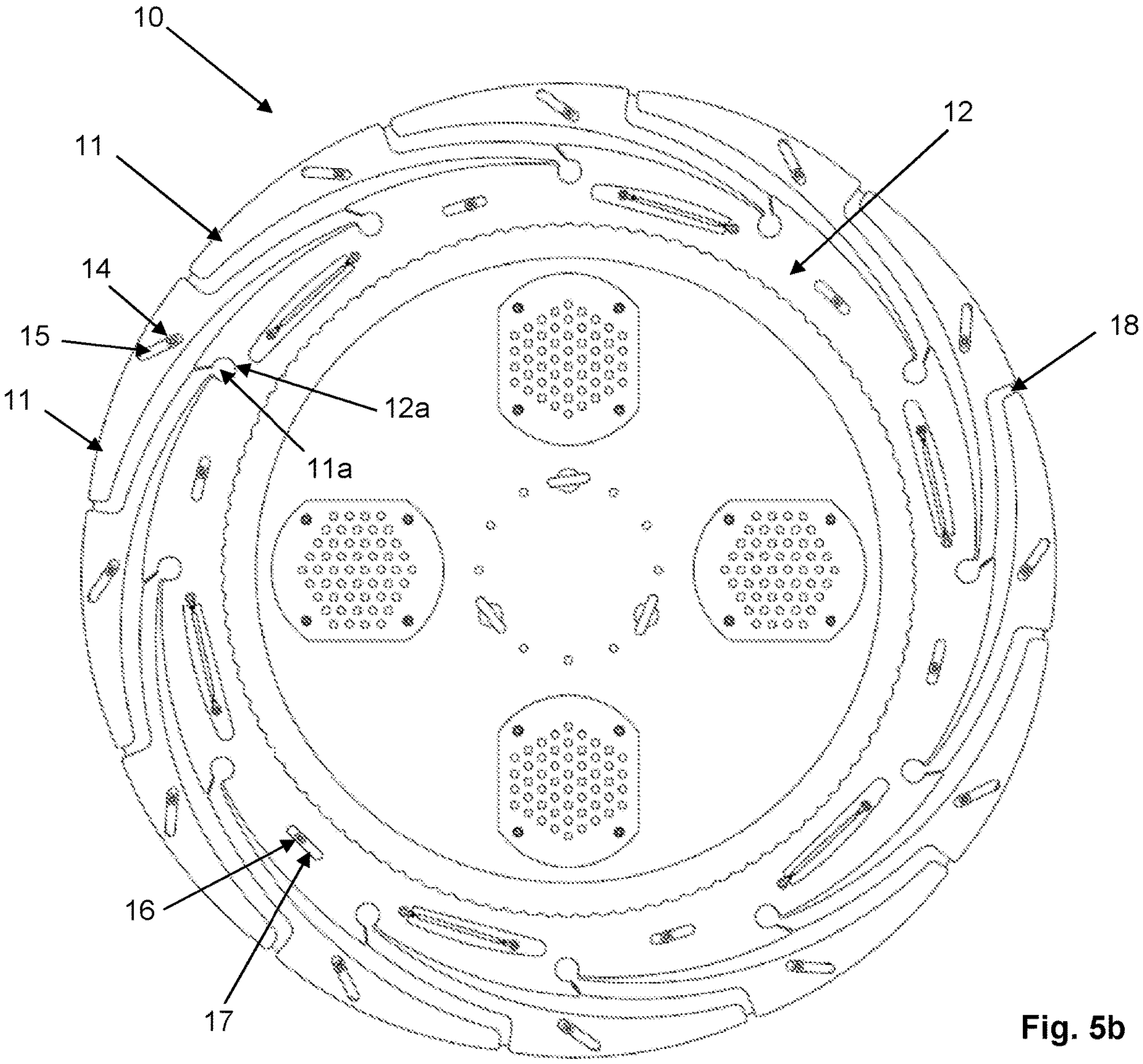

FIGS. 5*a* and 5*b* show, respectively, a lid according to an embodiment of the present invention in open and locked configurations; and FIGS. 6*a* to 6*d* show various stages in the fitting and locking of a lid to a container, according to an embodiment of the present invention.

Figure 1:
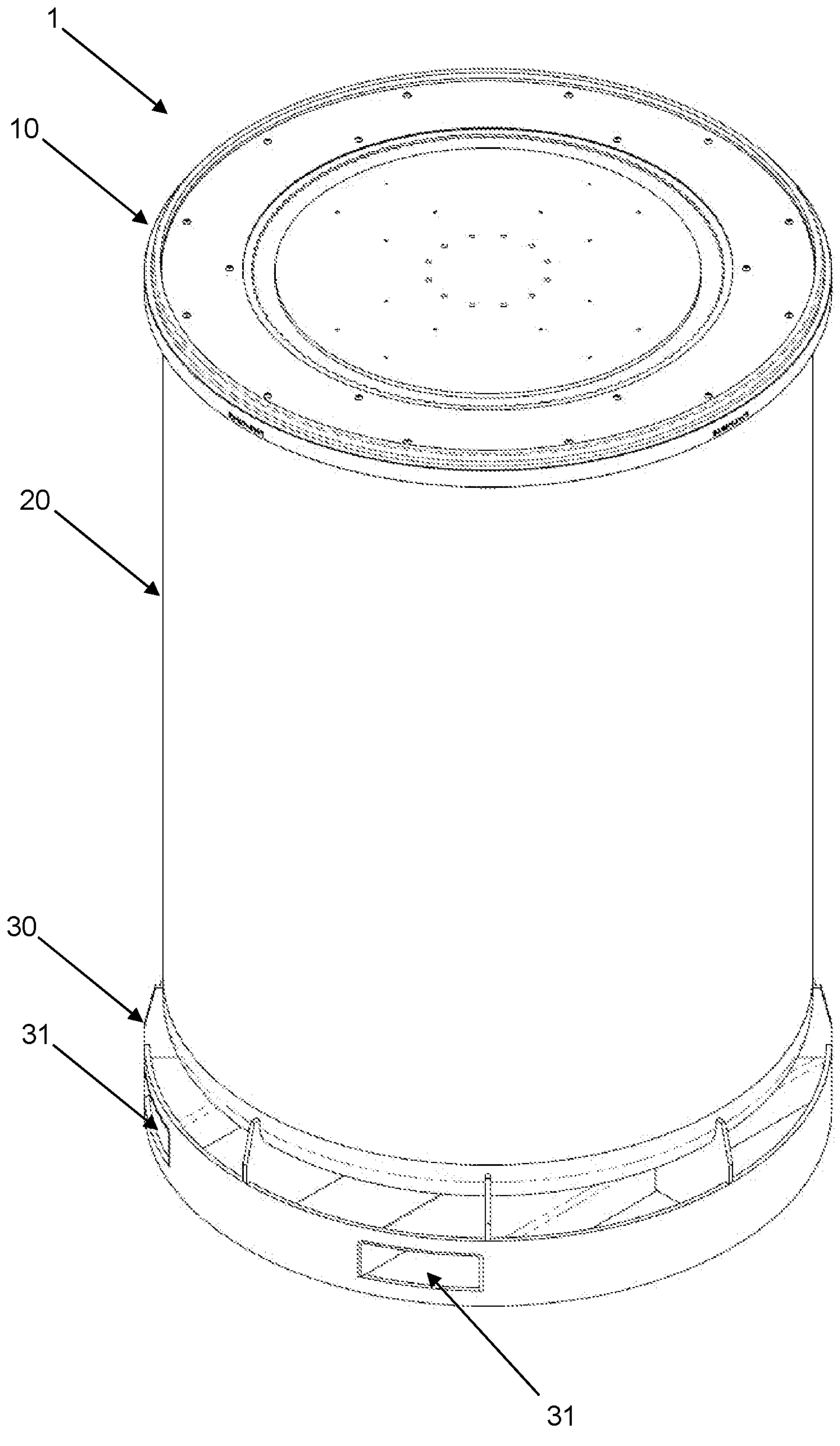
FIG. 1 shows a perspective view of a lid and container according to an embodiment of the present invention.

FIG. 1 shows a perspective view of a container 1, according to an embodiment of the invention, comprising a receptacle 20 and a lid 10. The receptacle 20 takes the form of an open-ended, circular cross-section cylinder, and it is arranged to receive waste material through the open end. The open end is arranged to receive a lid 10, which closes the container 1 and ensures that the waste included therein is kept safely therein and away from the external environment.

Once filled, each such container 1 may be stored for very many years in a secure storage facility. Since they will be stored for such a prolonged period, the containers 1 should be secure, strong, free from the risk of corrosion and inhibit the egress of material from the interior of the container 1. A container, according to an embodiment of the present invention is substantially formed from austenitic stainless steel to grade 1.4404 (316L). The corrosion performance and mechanical properties of stainless steel to grade 1.4404 are generally regarded as optimum for the packaging of radioactive waste.

The receptacle 20 is formed from three separate components. The upper section 20*c* is arranged to receive the lid; the mid-section 20*a* is a simple tube open at each end; and the lower section 20*b* is a closed dish of a diameter matching the diameter of the mid-section 20*a*. All three sections 20*a*, 20*b* and 20*c* are welded together to form the completed receptacle 20. The welding process uses, typically, arc welding techniques, which are well known in the art and provide a suitable and reliable result. If a receptacle of a different height is required, this is achieved by selection of a suitable mid-section 20*a*, since the upper and lower sections are standard and do not vary with the height of the receptacle.

The receptacle 20 comprises a support 30 at an opposite end to the lid 10. The support is fixedly attached to the receptacle by a welding operation. The support 30 includes a ring structure having a radius larger than the radius of the receptacle. This provides stability and permits several containers 1 to be stacked for storage.

The support 30 also comprises a pair of fork lift pockets 31 to receive a pair of forks from e.g. a fork-lift truck to allow the container 1 to be lifted and moved as required.

Additionally, or alternatively, the receptacle comprises a projecting ridge 21 proximal the open end of the receptacle. This projecting ridge 21 provides a means whereby a gripping mechanism may be used instead of a fork lift truck. Such a gripping mechanism may, for instance, comprise a pair of cooperating arms which act in unison to grip the container 1, with the projecting ridge 21, serving to ensure that the container does not slip from the grip of the gripping mechanism.

Figure 2:
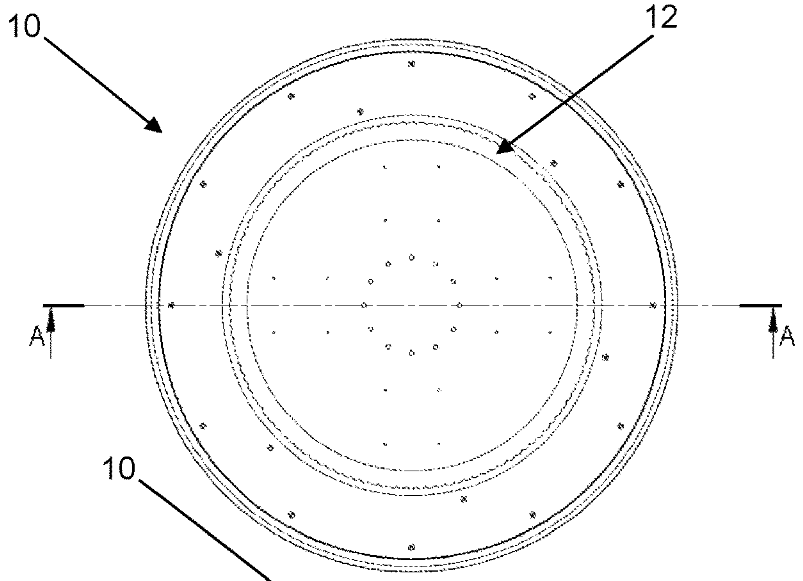
FIG. 2 shows a plan view of a lid of a container according to an embodiment of the present invention.

FIG. 2 shows a plan view of the lid 10 and receptacle 20. This shows a toothed wheel 12 which is accessible from the exposed surface of the lid 10 and which is used to operate a closure mechanism, which will be described shortly.

Figure 3:
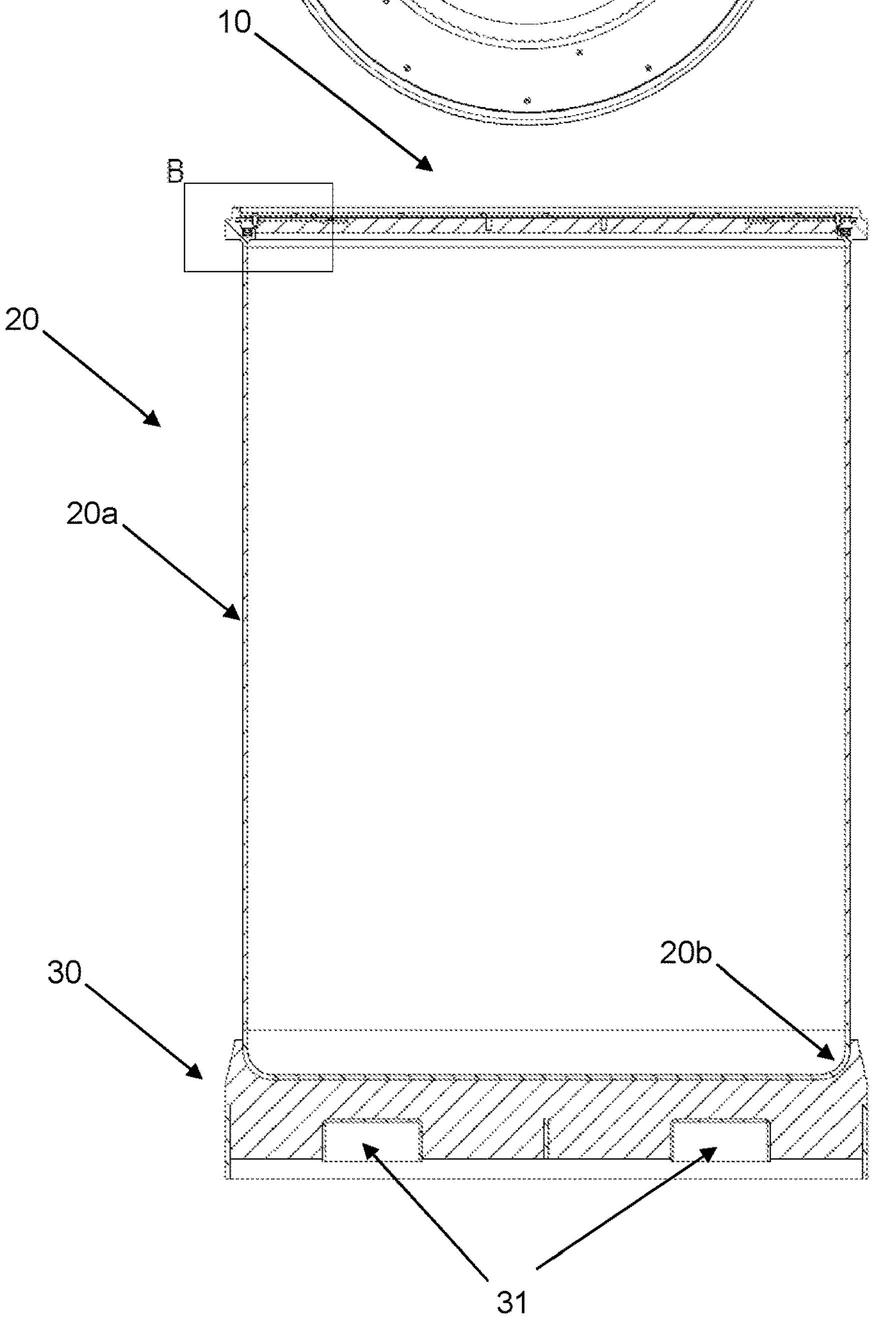
FIG. 3 shows a sectional view of a lid and container according to an embodiment of the present invention.

FIG. 3 shows a sectional view corresponding to the line A-A in FIG. 2. Here can be seen the interior of the receptacle 20, the support 30 and the lid 10, in situ.

Figure 4:
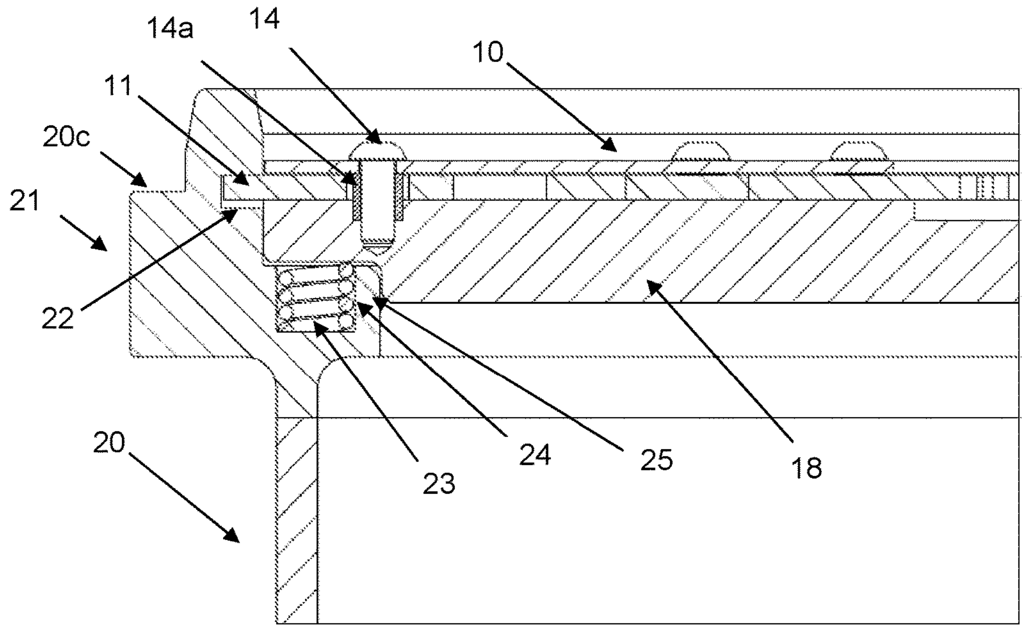
FIG. 4 shows a detailed sectional view of the interface between a lid and a container according to an embodiment of the present invention.

At the top left corner, there is a portion labelled B, which corresponds to FIG. 4, which shows a detailed view of this portion which is the interface between the receptacle 20 and the lid 10. This view shows the lid in the locked or closed configuration Receptacle 20 comprises projection 21, which extends outwardly from the main external body of receptacle 20. In the uppermost portion of receptacle 20, there is a circumferential groove 22, which runs around the internal surface of the receptacle 20. The groove 22 is arranged to receive a portion 11 of the lid 10, as described later.

Also arranged at an upper portion of the receptacle 20 is inwardly extending projection 25. This extends around the inner surface of the receptacle 20 and is arranged to receive and support the lid 10. The major diameter of the lid 10 is arranged to match the diameter of the upper part of the receptacle so that the lid fits snugly in the upper portion of the receptacle 20 and is supported by projection 25.

At various points around the projection 25, a recess 24 is provided. Each recess 24 is formed to receive a spring 23, which fits snugly in the recess. The plurality of springs 23 are provided to apply a relatively upward force to the lid 10, once it is fitted. Typically, there are twenty four such recesses 24 of 19 mm diameter, equi-spaced around the projection 25, each of which is provided with a spring 23. Further details of the operation of the springs 23 will be given in relation to FIGS. 6*a* to 6*d* later.

FIGS. 5*a* and 5*b* shows views of the lid 10 in unlocked (open) and locked (closed) configurations respectively. An upper cover of the lid which is normally in place has been removed to show the inner workings of the lid 10. In normal use, the lid 10 appears as in FIG. 2.

FIG. 5*a* shows the lid 10 in an unlocked configuration. This is to be contrasted with FIG. 5*b*, which shows the lid 10 in a locked configuration. The distinction is apparent by the extension of the plurality of arms 11 which, in FIG. 5*b*, extend beyond the major diameter of lid 10. In this context, the major diameter refers to the static portion 18 of the lid 10 which is arranged to rest on projection 25 of the receptacle 20.

The static portion 18 has a major diameter which matches the diameter of the opening to receptacle 20. The outermost portion of the circumference of static portion 18 has a shoulder portion which is arranged to cooperate with projection 25, such that the underside of the shoulder portion is arranged to face the plurality of springs 23 and the projection 25.

The static portion 18 is circular in plan view and is provided on an upper surface thereof with a substantially annular member 12. Annular member 12 is provided with a plurality of teeth on an inner circumference thereof. The annular member 12 is provided with a plurality of slots 17 approximately midway between its inner and outer circumferences. Each of these slots extends in a substantially arcuate manner relative to the centre of the annular member.

A fastening 16 is provided which fits through the slot 17 and fastens to the static member 18 in such a way that the annular member 12 is able to rotate relative to the static member 18, with the extent of rotation defined by the length of the plurality of slots 17. As can be seen in FIG. 5*a*, in the unlocked configuration, the fastening means 16 is located towards one end of the slot 17 and in FIG. 5*b*, in the locked configuration, the fastening means 16 is located towards the end of the slot 17.

The fastening means 16 may take the form of a nut or screw, which couples with an appropriate aperture provided in the static portion 18. The head of the nut or screw is arranged to be wider than the slot 17, thereby holding the annular member 12 in place. The nut or bolt 16 is tightened to an extent that the annular member 12 is attached to the static member 18 but relatively free to rotate.

The outer circumference of the annular member 12 comprises a plurality of recesses 12*a* of substantially circular form, with a channel provided at an outer edge thereof. Each recess 12*a* is arranged to receive a correspondingly shaped mating member 11*a* provided at an end of arm 11. In the embodiment show, there are a total of twelve such recesses, but there may be more or fewer depending on the particular requirements.

A plurality of arms 11 are provided around the outer circumference of the annular member 12. Each arm 11 has a substantially circular projection 11*a* arranged to fit into a recess 12*a* of the annular member 12. Each arm 11 is held in place in a similar manner to that used to secure the annular member 12 and static member 18. Each arm 11 has a slot 15. Fastening means 14 is provided which extends through the slot 15 and fastens to an aperture provided in static member 18 such that the arm can move to an extent determined by the slot 15. Surrounding each fastening means 14 is a phosphor bronze bush 14*a*, shown in FIG. 4. Similar bushes, not shown, surround fastening means 16 also.

The substantially circular projection 11*a*, once placed in the recess 12*a*, allows the arm to effectively pivot at this junction. This pivoting, as the annular member 12 is rotated relative to the static member 18, causes the arm 11 to be pushed relatively outwards to assume the position shown in FIG. 5*b*.

As can be seen in FIG. 5*b*, once the annular member 12 is rotated relative to the static member 18, all of the arms 11 extend beyond the major diameter of the static member 18. It is by virtue of this mechanism that the lid 10 can be attached and secured to the receptacle 20 in such a way that the lid 10 remains securely in place and cannot inadvertently become detached.

The attachment process is described more fully in connection with FIGS. 6*a* to 6*d*, which show various stages of the attachment operation. These figures largely correspond to the view shown in FIG. 4.

Figure 6A:
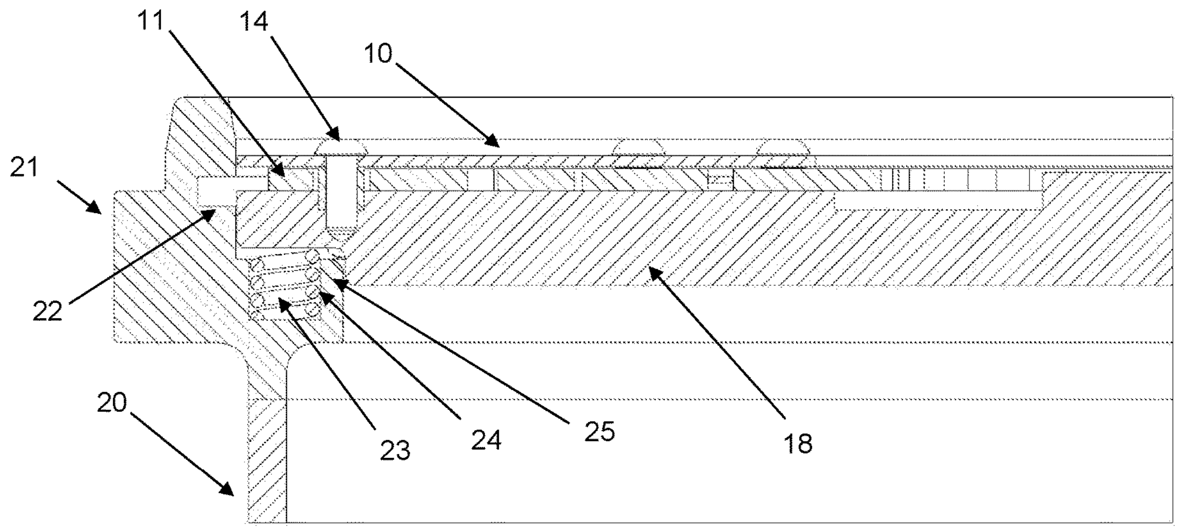

In FIG. 6*a*, lid 10 has been placed into the aperture at the top of receptacle 20. In this configuration, the springs 23 apply an upward force to the lid 10, which causes it to sit slightly proud of the projection 25. The weight of the lid 10, alone, is insufficient to overcome the biasing force of the springs 23.

Figure 6B:
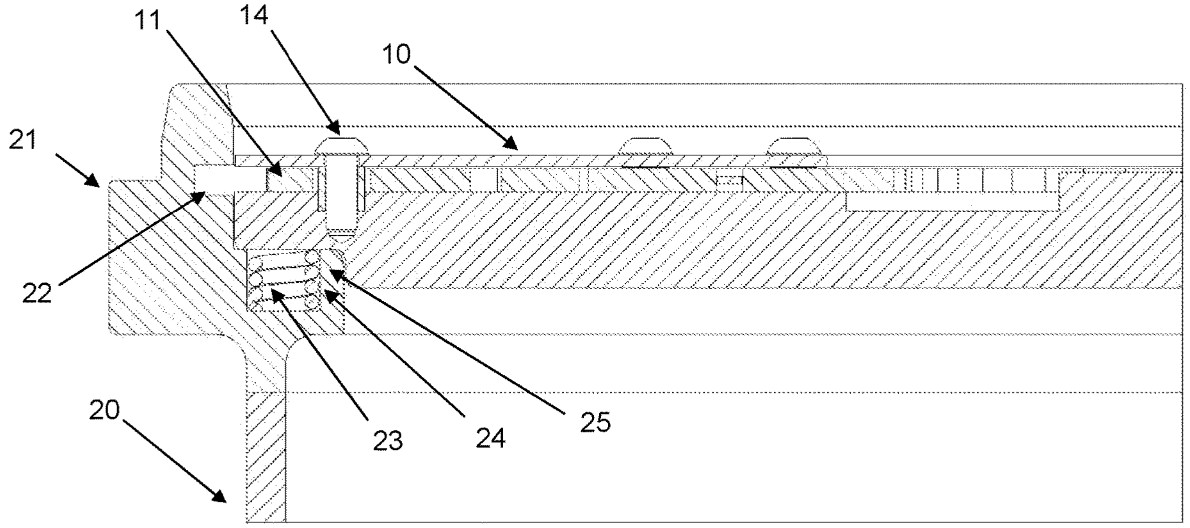

In FIG. 6*b*, the next stage in the process is shown. Here a relatively downward force is applied to overcome the biasing force of the springs 23. As can be seen, the static portion of the lid 18 now abuts directly the projection 25 and the springs 23 have been compressed.

The downward force required is provided by means of an external apparatus which is operable to place the lid 10 on the receptacle and, in due course, to activate the closure mechanism.

Although discrete springs 23 located in recesses 24 are shown, it will be appreciated that other biasing arrangements may be used. For instance a wave spring may be used in place of the coil springs 23.

In FIG. 6*b*, it can be seen that the groove 22 now aligns with the outer portion of arm 11, ready for the closure mechanism to operate.

Figure 6C:
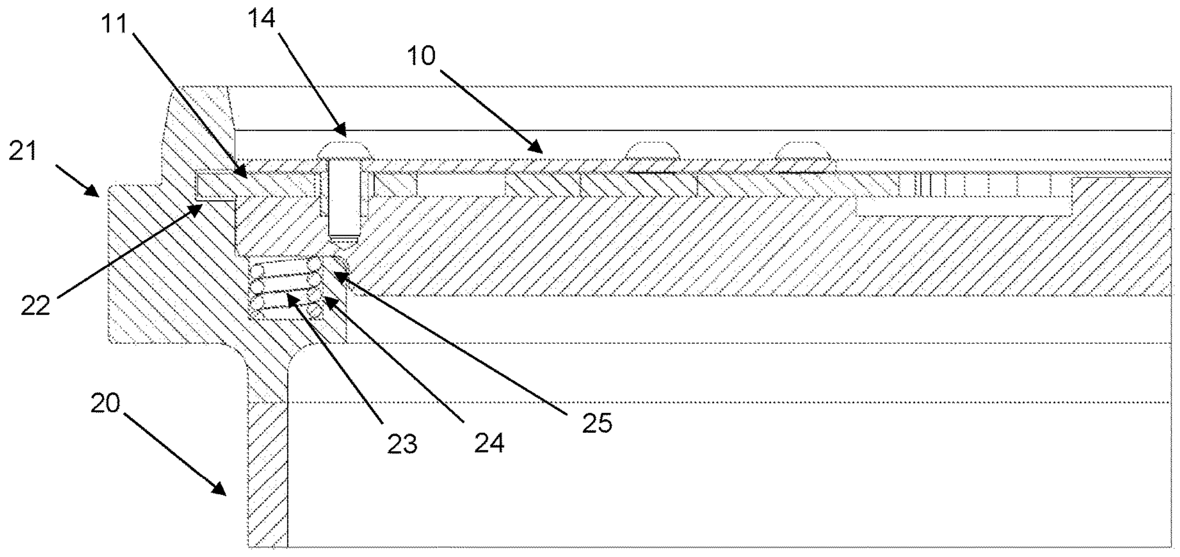

FIG. 6*c* shows the configuration as the closure mechanism is operated. The operation of the closure mechanism is best understood with reference to FIGS. 5*a* and 5*b*. Note that the actual appearance of the lid resembles the lid shown in FIG. 2.

Once the lid 10 is placed into the aperture at the top of receptacle 20 and a relatively downward force is applied, the closure mechanism may be operated. To do this, a remotely operated apparatus engages with the toothed internal circumference of the annular member 12. By imparting a relatively rotational force to the teeth, the annular member 12 rotates relative to the static member 18, which in turn causes the plurality of arms 11 to pivot and extend outwards beyond the major diameter of the static member 18. The details of the remotely operated apparatus are determined according to the particular requirements of a particular user. However, one way in which such an apparatus could operate is by means of a plurality of extending arms, which extend from a central hub, such that once the hub is located roughly in the centre of the lid, the arms can be extended so as to engage with the toothed inner circumference of annular member 12. A rotational force applied to the hub then causes the locking operation to complete.

The use of a plurality of teeth is exemplary ony and one or more different techniques may be employed to allow the remotely operated apparatus to provide a rotational force to the annular member 12. For instance, the inner circumference may be smooth and the remotely operated apparatus may have frictional (e.g. rubber or similar) grippers which engage and a frictional force may be imparted. The inner circumference may be roughened to assist in this regard, if required.

An advantage of such an arrangement is that there no need to index the lid. In other words, the relative angular relationship between the central hub of the remotely operated apparatus and the lid is unimportant. This is to be contrasted with a typical prior art container where a plurality of individual bolts are required to be fitted and tightened remotely. Such an operation requires careful and precise control and can take many minutes or even hours, compared to a few seconds for an embodiment of the present invention. When many thousands of such containers are to be filled, locked and stored, the time savings can be very significant.

Provided the relatively downward force is sufficient to overcome the bias of the springs 23, the outward portions of arms 11 extend into groove 22, as shown in FIG. 6*c*. Now, all of the arms are securely engaged in the groove and the lid 10 is affixed to the receptacle 20.

Figure 6D:
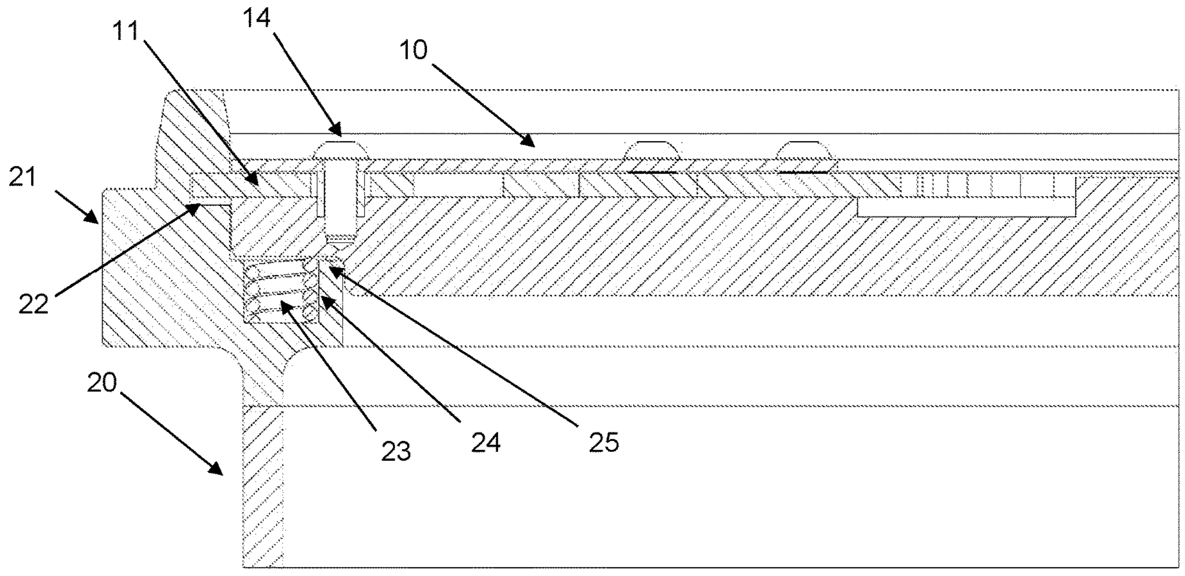

In the final stage, shown in FIG. 6*d*, the relatively downward force applied to the lid 10, is removed. This removes the force which compresses the springs 23, which now impart sufficient upward force to lift the lid 10 slightly from the projection 25. This can be seen in FIG. 6*d* where there is now a slight gap between the underside of static portion 18 and projection 25. Also, the upper surface of arm 11 abuts directly the underside of groove 22. The relatively upward force is continuously applied once the lid has been fitted locked.

In this final configuration, the lid 10 is firmly affixed to the receptacle in a manner which is suitable for storing radioactive waste.

In the field of radioactive materials containment, the concept of a "tortuous path" is defined in connection with the possible egress of particles from with a container. By use of a "tortuous path", materials are prevented from escaping or at least impeded by means of the lack of a direct route from an interior of a container to the exterior of the container. It should be noted that once a container 1 is locked, it is not necessarily required to be gas-tight. Since the contents may be stored for many hundreds of years, it is possible that as the contents decay, gasses may be produced. The risk of a container bursting through gas pressure is real and is typically to be avoided. As such, the container may be fitted with one or more vents 50 to allow any gasses to escape. If such a vent 50 is required, it is fitted to the lid 10 as shown in FIG. 5*a*. Whether a vent is provided or not is at the discretion of the end user.

The lid 10 may be provided with a visual indication that it is securely locked. This may take the form of a simple alignment icon on an exposed surface of the lid, such that an arrow or similar on the annular member 12 is made to align with a LOCKED icon or label or an UNLOCKED icon or label on a static portion of the lid 10, as appropriate. Such an indication provides a simple and reliable means of ensuring that a lid 10 has been properly fitted and locked.

Embodiments of the present invention offer advantages over prior art containers used in this field. In particular, there is a reduction in the number of parts in each container. There is also a reduction in the number of individual welds required to manufacture each container, which decreases production time and reduces opportunity for error.

Compared to prior art containers having a square or rectangular shape, embodiments of the present invention offer easier access and filling. In particular, the opening to the receptacle corresponds to the interior diameter and so there are no hidden 'corners'. Furthermore, unlike square or rectangular containers where it can be difficult to fill all corners of the interior, the circular shape of the interior of the receptacle is easily filled and maximises the available volume for storage.

Embodiments of the present invention allow for speedy and easy filling in a manner which optimises the volume available by avoiding hidden or hard to reach corners. The containers 1 may be stacked to a desired height and stored in this configuration.

The containers 1 may be stacked one on top of another in a generally vertical manner, up to a specified height. Alternatively, since the outermost diameters of the top and bottom of the container, as defined by the outer diameter of upper section 20*c* and support 30, are identical, the containers 1 may be stored on their sides, in a generally horizontal manner.

If it is desired to open a container after it has been closed, the steps set out in relation to FIGS. 6*a*-6*d* are effectively reversed and the interior of the receptacle is available and accessible.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A container comprising a lid (10) and a receptacle (20), the lid being arranged to close the receptacle and comprising:

a static portion (18) arranged to substantially match an opening of the receptacle to be closed;

a plurality of pivoting arms (11) coupled to the static portion;

means (12) for moving the plurality of pivoting arms between a first position wherein the plurality of pivoting arms lie within a perimeter of the static portion and a second position wherein the plurality of pivoting arms lie outside a perimeter of the static portion and engage with a complementary feature of the receptacle, wherein the receptacle is arranged to receive the lid, having an opening for receiving the static portion (18) of the lid, proximal to the opening there is provided a relatively inward-facing projection (25) to support the lid, and the relatively inward-facing projection (25) comprises a plurality of springs (23) arranged to provide, in use, a relatively upward force to the lid (10).

2. The container of claim 1, wherein the plurality of springs (23) are each arranged in a recess (24) in the relatively inward-facing projection (25).

3. The container of claim 1, wherein a circumferential groove (22) is provided proximal the opening, arranged to receive the plurality of pivoting arms (11).

4. A method of closing the container of claim 1 comprising the steps of:

placing the lid in an opening of a receptacle (20) and applying a relatively downward force thereto;

operating a closure mechanism while applying the downward force; and removing the downward force.

5. The container of claim 1, wherein the means (12) for moving the plurality of pivoting arms (11) comprises an annular member coupled to and movable relative to the static member.

6. The container of claim 5 wherein the annular member is coupled to the static member by means of a plurality of fasteners (16) arranged to pass through respective slots (17) in the annular member (12) and fasten to the static member (18).

7. The container of claim 6 wherein the annular member (12) is provided with a plurality of teeth on an inner circumference thereof.

8. The container of claim 1, wherein the means for moving the plurality of pivoting arms and the plurality of pivoting arms each comprise complementary couplings to facilitate a relative pivoting action therebetween.

9. The container of claim 8 wherein the complementary couplings comprise a substantially circular recess (12*a*) and a substantially circular projection (11*a*), whereby the substantially circular projection lies within the substantially circular recess and is arranged to rotate within it.

10. The container of claim 1, wherein the plurality of pivoting arms are each coupled to the static portion by means of fastener (14) arranged to pass through a respective slot (15) in each of the plurality of pivoting arms and fasten to the static member.

11. The container of claim 1, wherein the lid is provided with one or more vents (50) to permit the escape of gas from within the receptacle (20).

12. The container of claim 1, comprising an indicator to indicate the locked or unlocked status of the lid.

* * * * *